(12) United States Patent
Liu et al.

(10) Patent No.: US 12,118,803 B2
(45) Date of Patent: Oct. 15, 2024

(54) METHOD OF ROAD DETECTION BASED ON INTERNET OF VEHICLES

(71) Applicant: XI'AN CREATION KEJI CO., LTD., Xi'an (CN)

(72) Inventors: Chen Liu, Xi'an (CN); Yu Zuo, Xi'an (CN)

(73) Assignee: XI'AN CREATION KEJI CO., LTD., Xi'an (CN)

( * ) Notice: Subject to any disclaimer, the term of this patent is extended or adjusted under 35 U.S.C. 154(b) by 362 days.

(21) Appl. No.: 17/564,524

(22) Filed: Dec. 29, 2021

(65) Prior Publication Data
US 2023/0154202 A1 May 18, 2023

Related U.S. Application Data

(63) Continuation of application No. PCT/CN2021/130684, filed on Nov. 15, 2021.

(30) Foreign Application Priority Data

Oct. 23, 2020 (CN) ...................... CN2020111475226

(51) Int. Cl.
*G06V 20/56* (2022.01)
*G06V 10/75* (2022.01)
(Continued)

(52) U.S. Cl.
CPC ............ *G06V 20/588* (2022.01); *G06V 10/75* (2022.01); *G06V 10/762* (2022.01); *G06V 10/806* (2022.01); *G06V 10/82* (2022.01); *G06V 10/95* (2022.01); *H04L 12/40* (2013.01); *H04L 2012/40273* (2013.01)

(58) Field of Classification Search
CPC .... G06V 10/255; G06V 10/454; G06V 10/75; G06V 10/762; G06V 10/806; G06V 10/82; G06V 10/95; G06V 20/58; G06V 20/588; G06V 2201/08; H04L 12/40; H04L 2012/40273
See application file for complete search history.

(56) References Cited

FOREIGN PATENT DOCUMENTS

| CN | 109815886 A | * | 5/2019 | |
| CN | 111553406 A | * | 8/2020 | ........... G06K 9/4671 |

* cited by examiner

*Primary Examiner* — Michael J Vanchy, Jr.
(74) *Attorney, Agent, or Firm* — WPAT, PC

(57) ABSTRACT

A method of road detection based on Internet of Vehicles is provided, the method is applied to vehicle terminals and includes: obtaining a target road image captured by an image collection terminal and inputting it into an improved YOLOv3 network, performing feature extraction by using backbone network of dense connection to obtain feature images with different scales; performing feature fusion of top-to-down and dense connection to the feature images by using an improved feature pyramid networks (FPN) to obtain prediction results; obtaining attribute information of the target road image according to the prediction results; the attribute information includes positions and categories of objects in the target road image; the improved YOLOv3 is formed by based on YOLOv3 network, replacing residual modules of backbone network to dense connection modules, increasing feature extraction scale, optimizing feature fusion mode of FPN, performing pruning and performing network recovery processing guided by knowledge distillation.

10 Claims, 9 Drawing Sheets

(51) Int. Cl.
 *G06V 10/762* (2022.01)
 *G06V 10/80* (2022.01)
 *G06V 10/82* (2022.01)
 *G06V 10/94* (2022.01)
 *H04L 12/40* (2006.01)

METHOD OF ROAD DETECTION BASED ON INTERNET OF VEHICLES

TECHNICAL FIELD

The disclosure relates to the technical field of image detection, in particular to a method of road detection based on Internet of Vehicles and an in-vehicle electronic device.

DESCRIPTION OF RELATED ART

In recent years, Internet of Vehicles (IoV) technology has developed rapidly. Using this technology, the running vehicles can realize the network connection among vehicles, pedestrians, pavement facilities and service platforms with the help of the new generation of information and communication technology, so as to improve the overall intelligent driving level and traffic operation efficiency of vehicles.

In order to provide effective road information to the driver, so that the driver can plan the route in time, avoid emergency and realize safe driving. Some researchers combine object detection algorithm based on neural network with the IoV technology, take the road images, upload them to the cloud for image detection, the cloud can identify types and positions of the vehicles of the road images, and then transmit the detection results to the corresponding vehicles for using by the driver. However, uploading and downloading data to and from the cloud requires a certain amount of network bandwidth resources and takes a long time; At the same time, image processing in the cloud also takes some time. Therefore, it will bring a long transmission delay, resulting in poor real-time detection. However, road conditions are changing rapidly, and many traffic accidents will occur in a very short time.

Moreover, with the intensification of vehicles and the complexity of roads, higher requirements are put forward for the detection accuracy of road images, especially the need to accurately detect small objects in the image, such as small vehicles, or vehicles with small size in the image due to the capturing distance. However, the detection accuracy of the existing detection methods, especially for the small objects, is not ideal.

Therefore, it is urgent to propose a method of road detection based on IoV to achieve detection with high precision and high real-time.

SUMMARY OF THE DISCLOSURE

In order to propose a method of road detection based on IoV to achieve the detection with high precision and high real-time, embodiments of the disclosure provide a method of road detection based on IoV and an in-vehicle electronic device. The specific technical scheme is as follows:

In a first aspect, the embodiment of the disclosure provides a method of road detection based on IoV, the method is applied to vehicle terminals and includes:

obtaining a target road image captured by an image collection terminal;
  inputting the target road image into an improved YOLOv3 network obtained by pre-training, and performing feature extraction to the target road image by using a backbone network of dense connection (also referred to densely connected backbone network) to obtain x number of feature images with different scales; x is a natural number greater than or equal to 4;
  performing feature fusion of top-to-down and dense connection to the x number of feature images with different scales by using an improved feature pyramid network (FPN) to obtain prediction results corresponding to the respective scales; and
  obtaining attribute information of the target road image according to the prediction results; the attribute information includes positions and categories of objects in the target road image;
  the improved YOLOv3 network includes the backbone network of dense connection and the improved FPN; the improved YOLOv3 is formed by based on a YOLOv3 network, replacing residual modules of a backbone network to dense connection modules, increasing a feature extraction scale, optimizing a feature fusion mode of a FPN to obtain the improved FPN, performing pruning and performing network recovery processing guided by knowledge distillation; and the improved YOLOv3 network is trained according to sample road images and positions and categories of objects corresponding to the sample road images.

In a further embodiment, the backbone network of dense connection, includes: dense connection modules and transition modules connected in series and arranged alternately; and a number of the dense connection modules is y;

the dense connection module includes a convolutional network module and a dense connection unit group connected in series; the convolutional network module includes a convolutional layer, a batch normalization (BN) layer and a Leaky relu layer connected in series; the dense connection unit group includes m number of dense connection units;
  each of the m number of dense connection units includes a plurality of convolutional network modules connected in a dense connection mode and concatenately fuses feature images output by the plurality of convolutional network modules; and
  y is a natural number greater than or equal to 4, and m is a natural number greater than 1.

In a further embodiment, the obtain x number of feature images with different scales, includes: obtaining the x number of feature images of gradually increasing scales which are respectively outputted from x number of the dense connection modules sequentially arranged along a direction reverse to an input direction of the x number of dense connection modules.

In a further embodiment, each of the transition modules includes second convolutional network modules and a Maxpool layer; an input of the second convolutional network modules is shared with an input of the Maxpool layer, and a feature image output by the second convolutional network modules and a feature image output by the Maxpool layer are fused in the concatenated mode.

In a further embodiment, a number of the second convolutional network modules included in each of the transition modules is two or three, and the second convolutional network modules are connected in series.

In a further embodiment, the performing feature fusion of top-to-down and dense connection to the x number of feature images with different scales by using an improved FPN, includes:

for a prediction branch $Y_i$, obtaining the feature image of a corresponding scale from the x number of feature images with different scales and then performing convolution processing to obtain a convolution processed feature image;
  performing concatenated fusion to the convolution processed feature image and the feature images after convolution processing and up-sampling processing on prediction branches $Y_{i-1} \sim Y_1$;

the improved FPN includes x number of prediction branches $Y_1 \sim Y_x$ with gradually increasing scales; the scales of the x number of prediction branches $Y_1 \sim Y_x$ and the scales of the x number of feature images are correspond one by one; an up-sampling multiple of the prediction branch $Y_{i-j}$ is $2^j$; where i=2, 3, ..., x, and j is a natural number less than i.

In a further embodiment, the performing pruning and performing network recovery processing guided by knowledge distillation, includes:

for a network obtained by replacing the residual modules of the backbone network to the dense connection modules, increasing the feature extraction scale and optimizing the feature fusion mode of the FPN based on the YOLOv3 network, performing layer pruning to the dense connection modules of the backbone network of dense connection to obtain a YOLOv3-1 network;

performing sparse training to the YLOLv3-1 network to obtain a YOLOv3-2 network with a sparse distribution of BN layer scaling coefficients;

performing channel pruning to the YLOLv3-2 network to obtain a YOLOv3-3 network; and performing knowledge distillation to YOLOv3-3 network to obtain the improved YOLOv3 network.

In a further embodiment, before the improved YOLOv3 network is trained, the method further includes:

determining a pending clustering number for anchor box sizes of the sample road images;

obtaining a plurality of the sample road images marked with target box sizes;

based on the plurality of the sample road images marked with target box sizes, obtaining clustering results of the anchor box sizes of the sample road images by using a K-Means clustering method; and writing the clustering results into configuration files of the improved YOLOv3 network.

In a further embodiment, the improved YOLOv3 network further includes: a classification network and a non_max_suppression (NMS) module;

the obtaining attribute information of the target road image according to the prediction results, includes:

performing classification processing to the prediction results through the classification network, and then performing prediction box de reprocessing through the NMS module to obtain the attribute information of the target road image; the classification network includes a SoftMax classifier.

In a second aspect, an in-vehicle electronic device is provided by an embodiment of the disclosure, includes a processor, a communication interface, a memory and a communication bus; the processor, the communication interface and the memory are mutually communicated through the communication bus;

the memory is configured for storing computer programs; and the processor is configured for executing the computer programs stored in the memory to realize the steps of any methods of road detection based on IoV provided in the first aspect.

In schemes provided by the embodiments of the disclosure, on the first hand, the residual modules of the backbone network of the YOLOv3 network is replaced with the dense connection modules, and the feature fusion mode is changed from parallel to concatenate, so that the backbone network can directly take the early feature image as the input of each subsequent layer during performing feature extraction, and the amount of information of the feature image obtained is more, the feature transmission is strengthen, therefore, when detecting the target road image, the detection accuracy can be improved. Moreover, the number of parameters and the amount of computation can be reduced by reusing the feature image parameters of the shallow network. On the second hand, using multiple feature extraction scales to add fine-grained feature extraction scales for small objects can improve the detection accuracy of the small objects in the target road image. On the third hand, the feature fusion mode of the FPN is changed. The feature image extracted from the backbone network are fused in the mode of top-to-down and dense connection, and the deep features are directly performed up sampling in different multiples, so that all the transmitted feature images have the same size, and these feature images and shallow feature images are concatenately fused, more original information can be used, and high-dimensional semantic information is also involved in the shallow network, which helps to improve the detection accuracy; at the same time, more specific features can be obtained by directly receiving the features of the shallower network, which will effectively reduce the loss of features, reduce the amount of parameters to be calculated, improve the detection speed and achieve real-time detection. On the fourth hand, by performing layer pruning, sparse training, channel pruning and knowledge distillation to the pre trained network, and selecting optimized processing parameters in each processing process, the network volume can be simplified, most redundant calculations can be eliminated, and the detection speed can be greatly improved while maintaining the detection accuracy. The detection process of the cloud is deployed in the edge device with very limited storage resources and computing resources. The in-vehicle device can realize over the horizon road detection, realize high-precision and high real-time detection of objects on the road, and is conducive to the safe driving of drivers.

Of course, any product or method implementing the disclosure does not necessarily need to achieve all the advantages described above at the same time.

The disclosure will be further described in detail below in combination with the accompanying drawings and embodiments.

DETAILED DESCRIPTION OF EMBODIMENTS

The technical scheme in the embodiment of the disclosure will be described below in combination with the accompanying drawings in the embodiment of the disclosure.

In order to propose a method of road detection based on Internet of Vehicles (IoV) to realize high-precision and high real-time detection, the embodiments of the disclosure provide a method of road detection based on IoV and an in-vehicle electronic device.

It should be noted that an executing body of the method of road detection based on IoV provided by the embodiment of the disclosure can be a device of road detection based on IoV, which can run in the in-vehicle electronic device. The in-vehicle electronic device can be a plug-in in an image processing tool or a program independent of the image processing tool. Of course, it is not limited to this.

In a first aspect, an embodiment of the disclosure provides a method of road detection based on IoV. Next, firstly, the method of road detection based on IoV is introduced.

Figure 1:
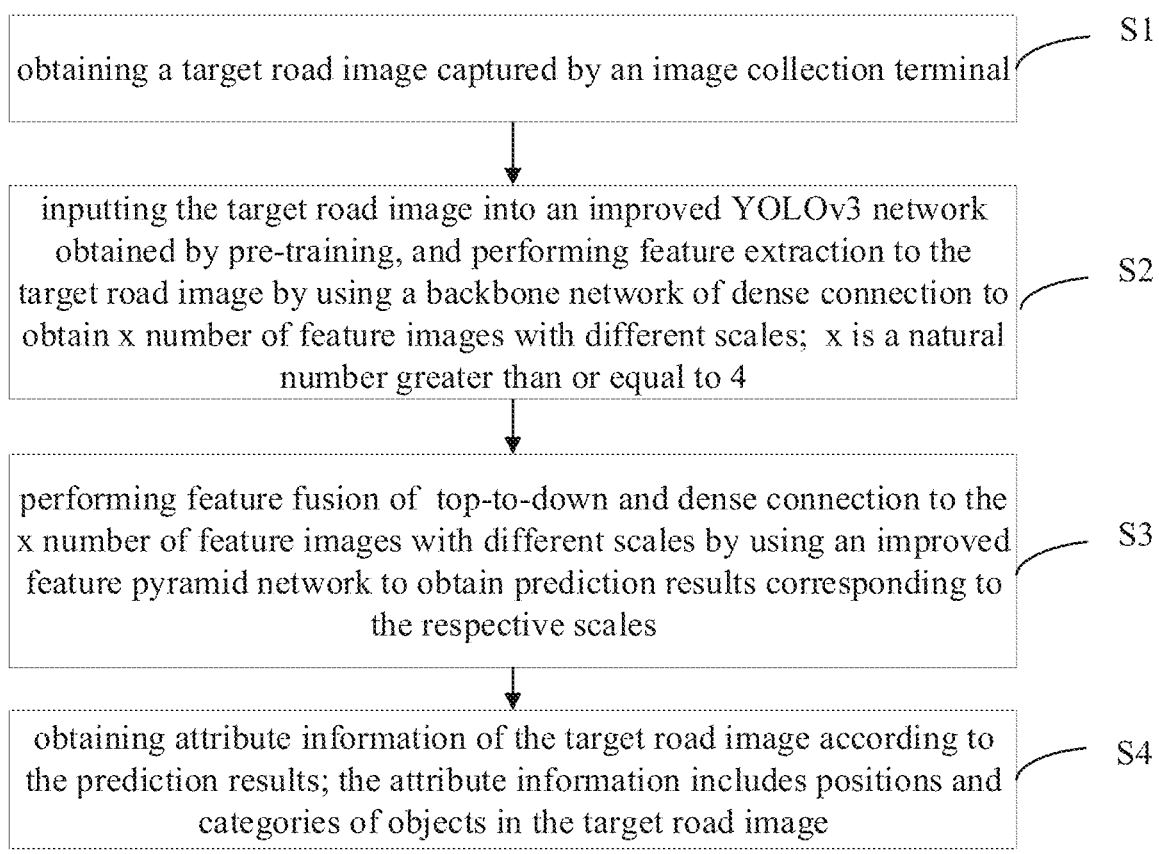
FIG. 1 is a flowchart of a method of road detection based on IoV according to an embodiment of the disclosure.

As shown in FIG. 1, the embodiment of the disclosure provides the method of road detection based on IoV, the method is applied to vehicle terminals and includes: step 1 (also referred to as S1) to step 4 (also referred to as S4):

S1, obtaining a target road image captured by an image collection terminal;

The target road image is an image taken by image collection device at the image collection terminal for the road area.

The image collection terminal can be other vehicles, pedestrians, pavement facilities, service platforms, etc. connected with the current vehicle through the IoV technology. For example, the image collection terminal can be high road facilities such as roadside lamp posts and overpasses, or flight equipment such as unmanned aerial vehicles (UAVs). The image collection device is deployed on these image collection terminals.

The image collection device can include a pickup head, a pickup camera, a camera, a mobile phone, etc. In an optional embodiment, the image collection device can be a high-resolution pickup head.

The image collection device can continuously collect road images of the corresponding area at a certain time interval, such as capturing at the rate of 30 frames per second (fps), and the collected road images are transmitted to the corresponding vehicle by the image collection terminal. Of course, the time interval can also be adjusted according to the density of objects on the road or according to needs.

One of the major problems in the IoV is an over the horizon problem. Due to the limited sight distance of the driver during driving on the road, it is impossible to observe the road conditions beyond the sight distance with the naked eye, especially when there are large vehicles and intersections ahead, the sight distance is more limited. However, in order to increase the understanding of road conditions, the IoV should solve the over the horizon problem, so that drivers can obtain road condition information beyond sight distance and adjust the driving plan as soon as possible. By setting the image collection terminal far away from the current vehicle to continuously collect the target road images, if these target road images can be effectively detected, it is bound to solve the above over the horizon problem for the current vehicle and bring great convenience to the driver.

In the embodiment of the disclosure, a size of the target road image is 416*416*3. Therefore, in this step, in an embodiment, the vehicle terminal can directly obtain the target road image with the size of 416*416*3 from the image collection terminal. In another embodiment, the vehicle terminal can obtain an image of any size sent by the image collection terminal, and the vehicle terminal can obtain the target road image with the size of 416*416*3 by scaling the obtained image.

Moreover, in the above two embodiments, image enhancement operations such as clipping, splicing, smoothing, filtering and edge filling can also be performed on the obtained image to enhance the features of interest in the image and expand the generalization ability of the data set.

Figure 2:
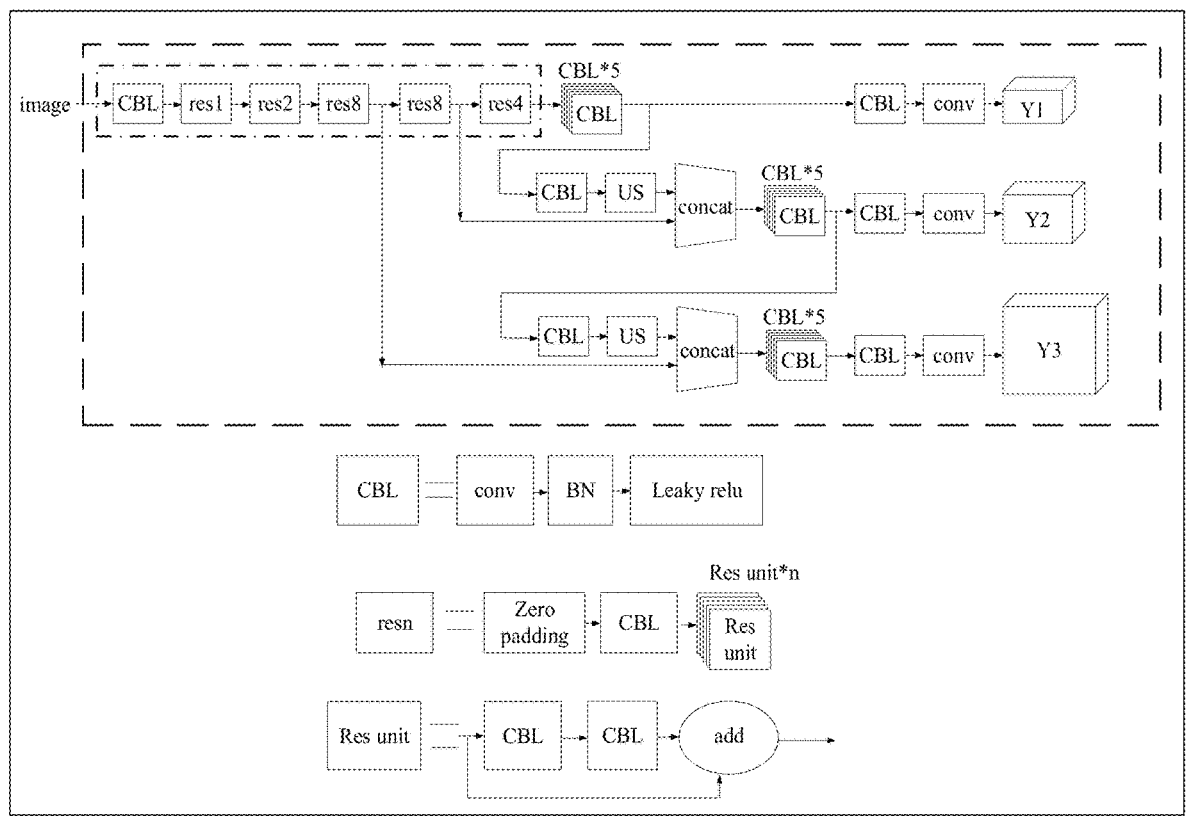
FIG. 2 is a schematic structural diagram of the YOLOv3 network of the prior art.

S2, inputting the target road image into an improved YOLOv3 network obtained by pre-training, and performing feature extraction to the target road image by using a backbone network of dense connection to obtain x number of feature images with different scales; x is a natural number greater than or equal to 4;

In order to understand a network structure of the improved YOLOv3 network proposed by the embodiment of the disclosure, firstly, a network structure of a YOLOv3 network in the prior art is introduced. Please refer to FIG. 2, which is a schematic structural diagram of the YOLOv3 network in the prior art. In FIG. 2, a part inside the dotted box is the YOLOv3 network. A part inside the dotted line box is a backbone network of the YOLOv3 network, that is, darknet-53 network; the backbone network of the YOLOv3 network includes a conv-bn-leaky relu (CBL) module and five number of resnut (resn) modules connected in series. The CBL module is a convolutional network module and includes a convolutional (conv) layer, a batch normalization (BN) layer and a Leaky relu layer corresponding to an activation function such as Leaky relu connected in series. The CBL means conv+BN+Leaky relu. The resn module is a residual module, and n represents natural number. As shown in FIG. 2, specifically, the res1, res2, res8, res8 and res4 are sequentially arranged along an input direction; the resn module includes a zero padding layer, the CBL module and a residual unit group connected in series. The residual unit group is represented by Res unit *n, which means that it includes n number of the residual (Res) units. Each residual unit includes a plurality of the CBL modules connected in a mode of residual network (ResNets). The feature fusion mode adopts the parallel mode, i.e. add mode.

The rest of the backbone network is a feature pyramid network (FPN), that is, a part inside the dotted box and outside the dotted line box in FIG. 2 is the FPN. The FPN is divided into three prediction branches $Y_1$~$Y_3$. The scales of the prediction branches $Y_1$~$Y_3$ corresponds to the scales of the feature images (also referred to as feature maps) outputted from the three residual modules res4, res8 and res8 sequentially arranged along a direction reverse to the input direction one by one. The prediction results of three prediction branches are represented by Y1, Y2 and Y3 respectively, and the scales of Y1, Y2 and Y3 are gradually increased.

Each prediction branch of the FPN includes a convolutional network module group, specifically including five number of the convolutional network modules, that is, CBL*5 in FIG. 2. In addition, US of FIG. 2 represents an up-sampling module, concat of FIG. 2 represents that feature fusion adopts concatenated mode, and concat of FIG. 2 is the abbreviation of concatenate.

For the specific composition of each main module in the YOLOv3 network, please refer to the schematic diagram inside the dotted box in FIG. 2.

In the embodiment of the disclosure, the improved YOLOv3 network includes the backbone network of dense connection and an improved FPN. The improved YOLOv3 network is formed by based on the YOLOv3 network, replacing the residual modules of the backbone network to dense connection modules, increasing a feature extraction scale, optimizing a feature fusion mode of the FPN to obtain the improved FPN, performing pruning and performing network recovery processing guided by knowledge distillation. The improved YOLOv3 network is trained according to sample road images and positions and categories of objects corresponding to the sample road images. The network training process will be introduced later.

In order to facilitate the understanding of the scheme of the disclosure, the structure of the improved YOLOv3 network is introduced below, and firstly, the backbone network is introduced.

Figure 3:
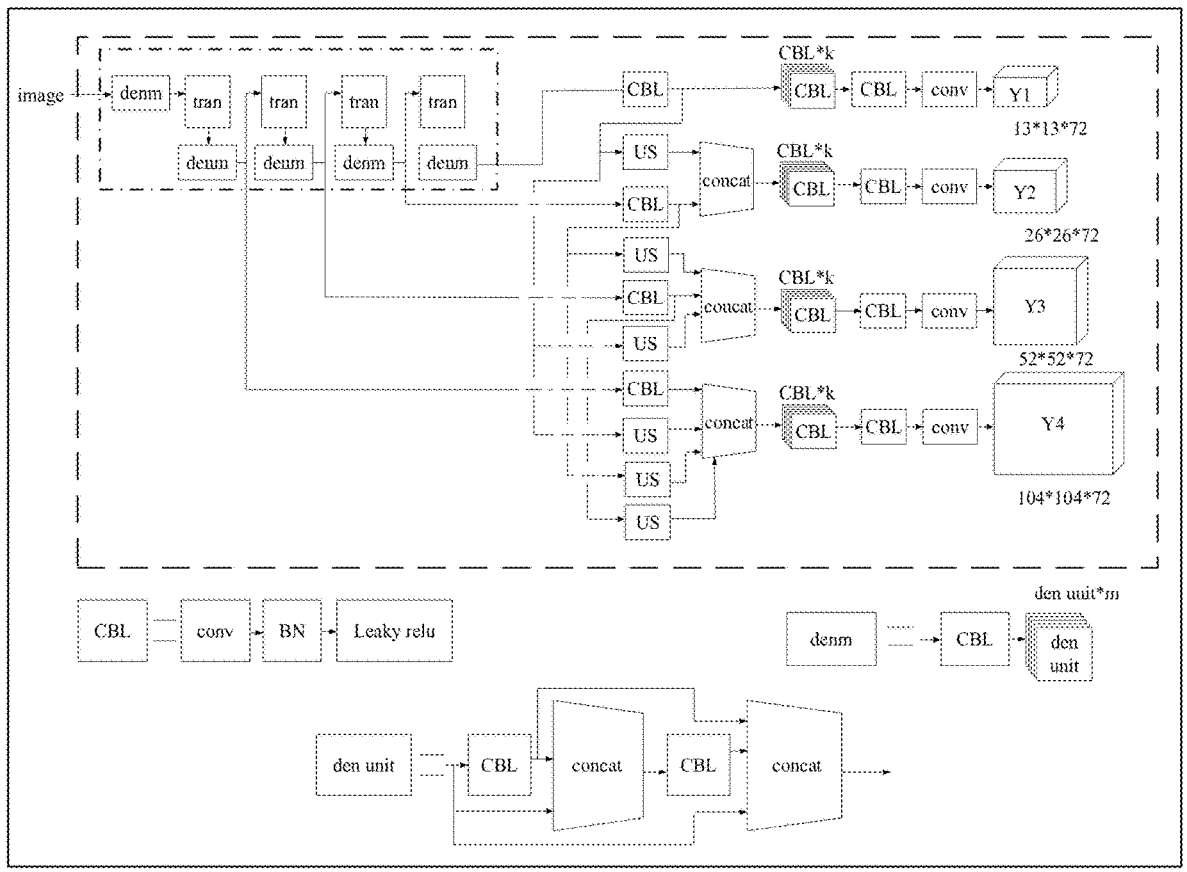
FIG. 3 is a schematic structural diagram of the improved YOLOv3 network according to the embodiment of the disclosure.

Please refer to FIG. 3 for the structure of the improved YOLOv3 network according to the embodiment of the disclosure. FIG. 3 is a schematic structural diagram of the improved YOLOv3 network provided by the embodiment of the disclosure. In FIG. 3, it can see that the backbone network has changed. See the part inside the dotted line box in FIG. 3.

The backbone network of the improved YOLOv3 network provided by the embodiment of the disclosure is compared with the backbone network of the YOLOv3 network, on the one hand, the improvement idea is to propose specific dense connection modules to replace the residual modules (also referred to as resn modules) of the backbone network of the YOLOv3 network by referring to the connection mode of the dense convolutional network (DenseNet). That is, the backbone network of the improved YOLOv3 network adopts the backbone network of dense connection. It is known that the ResNets combines the features by adding before transferring the features to the layer, that is, feature fusion is performed in the parallel mode. In order to ensure that information flows between layers in the network to the greatest extent, all layers (with matching feature image size) are directly connected to each other. Specifically, for each layer, all feature images of the previous layer are used as its input, and its own feature image is used as the input of all subsequent layers, that is, feature fusion adopts the concatenated mode. Therefore, compared with the residual modules used in the YOLOv3 network, the improved YOLOv3 network obtains more information of the feature image by changing to the dense connection modules. When detecting the road image, it can enhance the feature transmission and improve the detection accuracy. At the same time, because it does not need to relearn the redundant feature images, it can greatly reduce the number of parameters, reduce the amount of calculation, and alleviate the gradient disappearance problem. On the other hand, the embodiment of the disclosure transfers the feature image from shallow to deep, extracts the feature images of at least four scales, so that the network can detect objects of different scales. By increasing the fine-grained feature extraction scale, the detection accuracy can be improved for the small objects in subsequent target detection. The small objects in the embodiment of the disclosure include objects with small volume on the road, such as road signs, small obstacles, small animals, etc., or objects with small area in the image due to long capturing distance.

For example, referring to FIG. 3, the backbone network of dense connection can include:

dense connection modules and transition modules connected in series and arranged alternately; In FIG. 3, the dense connection module is represented as denm. A number of the dense connection modules is y; the dense connection module includes the convolutional network module and a dense connection unit group connected in series; the convolutional network module includes the convolution layer, the BN layer and the Leaky relu layer connected in series. The dense connection unit group includes m number of dense connection units; Each of the m number of dense connection units includes a plurality of the convolutional network modules connected in the dense connection mode and concatenately fuses the feature images output by the plurality of the convolutional network modules, where y is a natural number greater than or equal to 4, and m is a natural number greater than 1.

As an example, the number of the dense connection modules in FIG. 3 is 5. Compared with 4 number of dense connection modules, the improved YOLOv3 network composed of 5 number of the dense connection modules has higher accuracy.

The convolutional network module, represented as CBL as before. The dense connection unit group is represented as den unit*m, which means that the dense connection unit group includes the m number of the dense connection units, and m can be 2. Each dense connection unit is represented as den unit, each den unit includes the plurality of the convolutional network modules connected in the dense connection mode, and each den unit concatenately fuses the feature images outputted from the plurality of the convolutional network modules. The concatenated mode represents concat, which means tensor splicing. This operation is different from the operation of add in the residual module, concat will expand the dimension of the tensor, while add will only add directly and will not lead to the change of tensor dimension. Therefore, when extracting features from the backbone network of the improved YOLOv3 network, the dense connection module is used to change the feature fusion mode from parallel to concatenate, which can directly take the early feature image as the input of each subsequent layer, strengthen the feature transmission, and reduce the number of parameters and the amount of calculation by reusing the feature image parameters of the shallow network.

In some embodiments, the dense connection module and the transition module, the convolutional network module and the dense connection unit are embodied by at least one processor and at least one memory coupled to the at least one processor, and the at least one memory stores programs executable by the at least one processor.

In the embodiment of the disclosure, the backbone network of dense connection extracts at least four scales of the feature images for feature fusion of subsequent prediction branches. Therefore, y number of the dense connection modules is greater than or equal to 4, so as to fuse the feature image outputted by itself into each prediction branch. It can be seen that compared with the YOLOv3 network, the improved YOLOv3 network obviously adds at least one fine-grained feature extraction scale to the backbone network. Please refer to FIG. 3, compared with the YOLOv3 network, it is added to extract the feature image outputted from the fourth residual module arranged along the direction reverse to the input direction for subsequent feature fusion. Therefore, the four dense connection modules sequentially arranged along the direction reverse to the input direction of the backbone network of dense connection outputs corresponding feature images with gradually increased scales. Specifically, the scales of the four feature images are 13*13*72, 26*26*72, 52*52*72 and 104*104*72 respectively.

Of course, in the optional embodiment, five feature extraction scales can also be set, that is, the feature image outputted from the fifth dense connection module arranged along the direction reverse to the input direction can be added for subsequent feature fusion, and so on.

Specifically, for the S2, the obtain x number of feature images with different scales, includes:
  obtaining the x number of feature images with gradually increased scales which are respectively outputted from x number of the dense connection modules sequentially arranged along the direction reverse to the input direction of the x number of dense connection modules.

Referring to FIG. 3, the feature images respectively outputted from the first dense connection module to the fourth dense connection module sequentially arranged along the direction reverse to the input direction are obtained, and the sizes of the four feature images are gradually increased.

In the embodiment of the disclosure, for the structure of the transition module:

In an optional first embodiment, the transition module is the convolutional network module. That is, the CBL module is used as the transition module. Then, when building the backbone network of the improved YOLOv3 network, it only needs to replace the residual modules with the dense connection modules, and then connect the dense connection modules in series with the original CBL modules. In this way, the network construction process will be faster and the obtained network structure will be simpler. However, such the transition module only uses the convolution layer for transition, that is, it directly reduces the dimension of the feature image by increasing the step size. In this way, it can only take into account the local regional features, but cannot combine the information of the whole image. Therefore, more information will be lost in the feature image.

Figure 4:
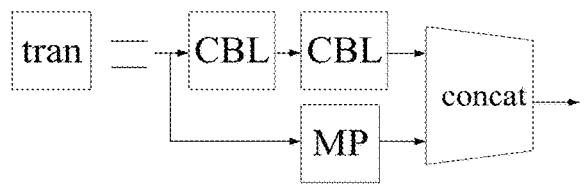
FIG. 4 is a schematic structural diagram of the transition module according to the embodiment of the disclosure.

In an optional second embodiment, the transition module includes the convolutional network modules and a Maxpool (MP) layer; an input of the convolutional network modules is shared with an input of the Maxpool layer, and the feature image output by the convolutional network modules and the feature image output by the Maxpool layer are fused in concatenated mode. See FIG. 4 for the structure of the transition module in this embodiment. FIG. 4 is a schematic structural diagram of the transition module provided by the embodiment of the disclosure. In this embodiment, the transition module is represented by tran in FIG. 4, and the MP in FIG. 4 represents the Maxpool layer. Further, the step size of the MP layer can be selected as 2. In this embodiment, the introduced MP layer can reduce the dimension of the feature image with a large receptive field; less parameters are used, so the amount of calculation will not be increased too much, which can weaken the possibility of over fitting and improve the generalization ability of the network model; combined with the original CBL module, it can be seen as reducing the dimension of the feature map from different receptive fields, so more information can be retained.

For the above second embodiment, it is optional that a number of the convolutional network modules included in each transition module is two or three, and the convolutional network modules are connected in series. Compared with using one convolutional network module, using two or three convolutional network modules connected in series can increase the complexity of the model and fully extract features.

S3, performing feature fusion of top-to-down and dense connection to the x number of feature images with different scales by using the improved FPN to obtain prediction results corresponding to respective scales;

The feature fusion mode of top-to-down and dense connection is introduced below in combination with the structure of the improved FPN in FIG. 3.

The improved FPN includes x number of prediction branches $Y_1 \sim Y_x$ with gradually increased scale; the scales of the prediction branches $Y_1 \sim Y_x$ correspond to the scales of the x number of feature images one by one; For example, the improved FPN of FIG. 3 has four prediction branches $Y_1 \sim Y_4$, and their scales correspond to the scales of the above four feature images one by one.

For the S3, the performing feature fusion of top-to-down and dense connection to the x number of feature images with different scales by using the improved FPN, includes:
  for the prediction branch $Y_i$, obtaining the feature image with a corresponding scale from the x number of feature images with different scales and then performing convolution processing to obtain a convolution processed feature image;
  performing concatenated fusion to the convolution processed feature image and the feature images after convolution processing and up-sampling processing on the prediction branches $Y_{i-1} \sim Y_1$;
  an up-sampling multiple of the prediction branch $Y_{i-j}$ is $2^j$, where i=2, 3, . . . , x, and j is a natural number less than i.

Referring to FIG. 3, taking i=3 that is the prediction branch $Y_3$ as an example, the feature images for concatenated fusion processing comes from three aspects: the first aspect is to obtain the feature image with the corresponding scale from the four feature images and then perform convolution processing, that is, the feature image is obtained by the feature image outputted from the third dense connection module arranged along the direction reverse to the input direction (also referred to as second dense connection module arrange along the input direction in FIG. 3) through the CBL module, the feature image can also be understood as that after double up-sampling, the size is 52*52*72; the second aspect comes from the prediction branch $Y_2$ (i.e., $Y_{i-1}=Y_2$), that is, the feature image (size is 52*52*72) is obtained by the feature image (size is 26*26*72) outputted from the second dense connection module arranged along the direction reverse to the input direction (also referred to as third dense connection module arranged along the input direction) through the CBL module of the prediction branch $Y_2$ to be performed $2^1=2$ multiple up-sampling processing; the third aspect comes from the prediction branch $Y_1$ (i.e., $Y_{i-2}=Y_1$), the feature image (size is 52*52*72) is obtain by the feature image (13*13*72) outputted from the first dense connection module arranged along the direction reverse to the input direction (also referred to as fourth dense connection module arranged along the input direction) through the CBL module of the prediction branch $Y_1$ to be performed $2^2=4$ multiple up-sampling processing. Then, it can be understood by those skilled in the art that the above process can make the sizes of the three feature images to be concatenated and fused consistent, all 52*52*72, after the three feature images with different scales outputted from the backbone network are performed up-sampling by different multiples. In this way, the prediction branch $Y_3$ can continue convolution and other processing after cascade fusion to obtain the prediction result Y3, and the size of Y3 is 52*52*72.

For the feature fusion process of prediction branch $Y_2$ and $Y_4$, see the prediction branch $Y_3$, which will not be repeated here. For the prediction branch $Y_1$, after obtaining the feature image outputted from the first dense connection module arranged along the direction reverse to the input direction, it performs the subsequent prediction process by itself, and does not accept the fusion of the feature images of other prediction branches.

In the original feature fusion mode of the FPN of the YOLOv3 network, the deep and shallow network features are added first, and then performed up-sampling together. After adding the features, this method extracts the feature image through the convolution layer, which will destroy some original feature information. In this embodiment, the feature fusion combines the horizontal mode and the top-to-down dense connection mode (also referred to as the mode of top-to-down and dense connection). In this mode, the original top-to-down mode becomes the feature image of the prediction branch with smaller scale, directly transmits its own features to each prediction branch with larger scale, and changes the feature fusion mode into the dense fusion mode, that is, the deep features are directly up-sampled by different multiples, so that all the transmitted feature images have the same size. These feature images and shallow feature images are concatenately fused, and the features are extracted again from the fusion results to eliminate the noise, retain the main information, and then predict. In this way, more original information can be used, and high-dimensional semantic information can also be involved in the shallow network. Therefore, this can give play to the advantage of dense connection network to retain more original semantic features of the feature image, but for the top-to-down method, the retained original semantics is higher dimensional semantic information, which can be helpful for object classification. By directly receiving the features of the shallower network, more specific features can be obtained, which will effectively reduce the loss of features, reduce the amount of parameters to be calculated, and accelerate the prediction process.

The above mainly introduces the feature fusion methods. After feature fusion, each prediction branch mainly uses some convolution operations to predict. For how to obtain their prediction results, please refer to the relevant prior art, which will not be described here.

Then, in the embodiment of the disclosure, the above feature fusion of top-to-down and dense connection can be adopted for the improved YOLOv3 network using two different forms of transition modules. In a preferred embodiment, this step is implemented in the improved YOLOv3 network using the transition module shown in FIG. 4. Later, the improved YOLOv3 network refers to the network obtained from FIG. 3 combined with FIG. 4.

In the improved YOLOv3 network of the embodiment of the disclosure, four prediction branches output four feature images with four scales, which are respectively 13*13*72, 26*26*72, 52*52*72 and 104*104*72, minimum feature image with 13*13*72 is suitable for detecting larger objects because it has a largest receptive field; medium feature image with 26*26*72 is suitable for detecting medium-sized objects because it has a medium receptive field; larger feature image with 52*52*72 feature image is suitable for detecting smaller objects because it has a smaller receptive field; maximum feature image with 104*104*72 is suitable for detecting smallest objects because it has a smallest receptive field. It can be seen that the embodiment of the disclosure divides the image more finely, and the prediction result is more targeted for objects with small size.

The following describes the network training process. Network training is completed in the server. Network training can include three processes: network pre training, network pruning and network fine tuning. It can include the following steps:

(1) building of network structure; it can be improved on the basis of the YOLOv3 network, replacing the residual modules of the backbone network with dense connection modules, increasing the feature extraction scale, optimizing the feature fusion mode of the FPN, and improving the transition module to obtain the network structure as shown in FIG. 3 and FIG. 4 as a built network; where m=4.

(2) obtaining of a plurality of sample road images, positions and categories of objects corresponding to the plurality of sample road images. In this process, the positions and the categories of the objects corresponding to the sample road images are known. The way to determine the positions and the categories of the objects corresponding to the sample road images can be: through manual recognition, or through other image recognition tools, etc. After that, it is necessary to mark the sample road image, which can be marked manually. Of course, other artificial intelligence methods can also be used for non-artificial marking, which is reasonable. Among them, the position of the object corresponding to the sample road image is marked in the form of a target box containing the object. This target box is true and accurate, and each target box is marked with coordinate information to reflect the position of the object in the image.

(3) determining of anchor box sizes of the sample road images, can include the following steps:

a) determining a pending clustering number of the anchor box sizes of the sample road images;

In the field of object detection, anchor boxes are a plurality of boxes with different sizes obtained by performing statistics or clustering from ground truths of the training set; the anchor boxes are actually to restrict the predicted object range and add dimensional prior experience, so as to realize the purpose of multi-scale learning. In the embodiment of the disclosure, because it is desired to add a finer grained feature extraction scale, it is necessary to cluster the sizes of already marked target box (that is, the ground truth)

of the sample road images by using the clustering method to obtain suitable anchor box sizes suitable for the scenario of the embodiment of the disclosure.

further, the determining a pending clustering number of the anchor box sizes of the sample road images, includes:

determining a number of types of the anchor box sizes corresponding to each scale; using a product of the number of types of the anchor box sizes corresponding to each scale and the x as the pending clustering number of the anchor box sizes of the sample road images.

Specifically, in the embodiment of the disclosure, the number of types of the anchor box size corresponding to each scale is 3; if there are 4 scales, the pending clustering number of the anchor box sizes of the obtained sample road images is 3*4=12.

b) obtaining the plurality of sample road images marked with the target box sizes;

This step is actually to obtain the size of each target box in the sample road images.

c) based on the plurality of sample road images marked with the target box sizes, obtaining clustering results of the anchor box sizes of the sample road images by using a K-Means clustering method;

Specifically, the size of each target box can be clustered by using K-Means clustering method to obtain the clustering result of the anchor box size. The clustering process will not be repeated here.

Among them, the distance between different anchor boxes is defined as the Euclidean distance of width and height:

$$d_{1,2}=\sqrt{(w_1-w_2)^2+(h_1-h_2)^2}.$$

Where, $d_{1,2}$ represents the Euclidean distance between the two anchor boxes, $w_1$, $w_2$ represent the width of the anchor box, and $h_1$, $h_2$ represent the height of the anchor box.

For the pending clustering number is 12, the clustering results of the anchor box sizes can be: (13,18), (20,27), (26,40), (38,35), (36,61), (56,45), (52,89), (70,61), (85,89), (69,155), (127,112), (135,220). Specifically:

Anchor box sizes of the predicted branch $Y_1$: (69,155), (127,112), (135,220);

Anchor box sizes for the predicted branch $Y_2$: (52,89), (70,61), (85,89);

Anchor box sizes for the predicted branch $Y_3$: (38,35), (36,61), (56,45);

Anchor box sizes for the predicted branch $Y_4$: (13,18), (20,27), (26,40);

d) writing the clustering results into configuration files of the road image detection network.

It can be understood by those skilled in the art that the clustering results are written into the configuration files of the prediction branches of the road image detection network according to the anchor box size corresponding to different prediction branches, and then the network pre training can be performed.

(4) Using each sample road image and the positions and the categories of the objects of the sample road images to pre train the built network, includes the following steps:

1) taking the position and the category of the object of each sample road image as the corresponding true value of the sample road image, training each sample road image and the corresponding true value through the built network, and obtaining the training result of each sample road image.

2) comparing the training result of the sample road image with the corresponding true value of the sample road image to obtain the corresponding output result of the sample road image.

3) according to the corresponding output result of each sample road image, calculating the loss value of the network.

4) adjusting the parameters of the network according to the loss value, and repeating steps 1) to 3) until the loss value of the network reaches a certain convergence condition, that is, the loss value reaches the minimum. At this time, it means that the training result of each sample road image is consistent with the corresponding true value of the sample road image, so as to complete the pre training of the network, a complex network with high accuracy is obtained.

(5) network pruning and network fine tuning; this process is the performing pruning and performing network recovery processing guided by knowledge distillation.

the performing pruning and performing network recovery processing guided by knowledge distillation, includes:

① for the network (i.e. the above-mentioned complex network) obtained by replacing the residual modules of the backbone network to the dense connection modules, increasing the feature extraction scale and optimizing the feature fusion mode of the FPN based on the YOLOv3 network, performing layer prune to the dense connection modules of the backbone network of dense connection to obtain a YOLOv3-1 network;

Usually, the channel pruning will be directly performed in the simplified process of the YOLOv3 network, but the applicant found in the experiment that it is still difficult to achieve the effect of rapid speed improvement only through the channel pruning. Therefore, the layer pruning process is added before channel pruning.

Specifically, in this step, the dense connection modules of the backbone network in the above complex network can be performed the layer pruning, that is, the number m of the dense connection units included in the dense connection module can be performed layer pruning to reduce m to 2 to obtain the YOLOv3-1 network.

② performing sparse training to the YLOLv3-1 network to obtain a YOLOv3-2 network with a sparse distribution of BN layer scaling coefficients;

For example, the performing sparse training to the YLOLv3-1 network to obtain a YOLOv3-2 network with a sparse distribution of BN layer scaling coefficients, can include:

performing sparse training to the YLOLv3-1 network, in the training process, sparse regularization is added for a scaling factor γ, and the loss function of the sparse training is:

$$\text{Loss} = \sum_{x,y}\text{loss}(f(x, W), y) + \lambda \sum_{y\in\Gamma} g(\gamma).$$

Where, $$\sum_{x,y}\text{loss}(f(x, W), y)$$

represents the original loss function of the network, (x, y) represent input data and target data of the training process, W represents the trainable weight, and $$\lambda \sum_{y \in \Gamma} g(\gamma)$$

represents the regular term added to the scale coefficient, g(γ) represents a penalty function for sparse training of scale coefficients, λ represents the weight. To make the scale coefficient γ sparse, L1 norm is selected as the penalty function. At the same time, because we don't know the proportion of the latter item, we introduce the parameter λ to adjust.

Since the value of λ is related to the convergence speed of sparse training, the application scenario of the embodiment of the disclosure is the road object detection scenario, and the number of types of objects to be detected can be set to 13, which is far less than 80 types in the original YOLOv3 data set. Therefore, the value of λ can be larger, and the convergence speed of the sparse training will not be very slow, at the same time, the convergence can be further accelerated by improving the learning rate of the model. However, considering that too large parameter selection will cause a certain loss to the accuracy of the network model, after continuously adjusting the learning rate and parameter λ, a combination of the learning rate is 0.25 and λ is 0.1 is finally determined to use as the optimal parameter combination for the sparse training. The preferred combination of learning rate and weight in the embodiment of the disclosure is more favorable for the distribution of weight after coefficient training, and the accuracy of the network model is also higher.

③ performing channel pruning to the YLOLv3-2 network to obtain a YOLOv3-3 network;

After the sparse training, a network model with the sparse distribution of BN layer scaling coefficients is obtained, which is convenient to determine which channels are less important. Thus, these less important channels can be pruned by deleting incoming and outgoing connections and corresponding weights.

Performing channel pruning to the network, pruning a channel basically corresponds to deleting all incoming and outgoing connections of the channel. A lightweight network can be obtained directly without using any special sparse calculating packets. In the process of the channel pruning, the scaling factor acts as the agent of channel selection; because they are optimized together with the network weight, the network can automatically identify irrelevant channels, which can be safely removed without greatly affecting the generalization performance.

Specifically, this step can include the following steps:
setting a channel pruning ratio in all channels of all layers, then arranging all the BN layer scaling coefficients in the YOLOv3-2 network in ascending order, and cutting off the corresponding channels of the BN layer scaling coefficients in front according to the channel pruning ratio.

In a preferred embodiment, the channel pruning ratio may be 60%.

Through the channel pruning, redundant channels can be deleted, the amount of calculation can be reduced and the speed of detection can be accelerated.

However, after the channel pruning, the accuracy may decrease due to the reduction of parameters. Analyze the impact of different pruning ratios on the network accuracy. If the network pruning ratio is too large, the network volume will be compressed more, but it will also cause a sharp decline in the network accuracy and cause a certain loss to the network accuracy. Therefore, it is necessary to make a trade-off between the network compression ratio and the compressed network accuracy. Therefore, the knowledge distillation strategy is introduced to fine tune the network to make the network accuracy rise.

④ performing knowledge distillation to the YOLOv3-3 network to obtain the improved YOLOv3 network.

After pruning, a more compact YOLOv3-3 network model is obtained, and then fine-tuning is needed to restore the accuracy. The strategy of knowledge distillation is introduced here.

Specifically, knowledge distillation is introduced into the YOLOv3-3 network. The above complex network is used as the teacher network and the YOLOv3-3 network is used as the student network. The teacher network guides the student network to restore and adjust the accuracy, and the improved YOLOv3 network is obtained.

As a preferred embodiment, the output result before the Softmax layer of the complex network can be divided by the temperature coefficient to soften the predicted value finally output by the teacher network, and then the student network uses the softened predicted value as a label to assist in training the YOLOv3-3 network, and finally realize that the accuracy of the YOLOv3-3 network is equivalent to that of the teacher network. The temperature coefficient is a preset value and does not change with the network training.

The reason why the temperature parameter T is introduced is that the classification results of input data in a trained and highly accurate network are basically consistent with the real labels. Taking three classifications as an example, the real known training category label is [1,0,0], and the prediction result may be [0.95,0.02,0.03], which is very close to the real label value. Therefore, for the student network, there is little difference between using the classification results of the teacher network to assist training and directly using data for training. The temperature parameter T can be used to control the softening degree of the prediction label, that is, it can increase the deviation of the classification result of the teacher network.

Comparing the fine-tuning process added knowledge distillation strategy with the general fine-tuning process, the network accuracy restored by the knowledge distillation is higher.

By performing layer pruning, sparse training, channel pruning and knowledge distillation on the pre trained network, and selecting optimized processing parameters in each processing process, a simplified network is obtained. The volume of the network is greatly reduced and most redundant calculations are eliminated, the network obtained after this step is the improved YOLOv3 network for subsequent detection of the target road image. The detection speed based on this network can be greatly improved and the detection accuracy can be maintained. It can meet the requirements of high real-time detection. Due to the small network volume and small demand for resources, it can be deployed on edge devices, that is, in-vehicle devices. The in-vehicle device can be device placed in the vehicle, such as navigator, mobile phone, etc.

S4, obtaining attribute information of the target road image according to the prediction results; the attribute information includes positions and categories of objects in the target road image;

the improved YOLOv3 network further includes: a classification network and a non_max_suppression (NMS) module. The classification network and the NMS module are connected in series behind the FPN.

The obtaining attribute information of the target road image according to the prediction results, includes:
  performing classification processing to the prediction results through the classification network, and then performing prediction box de reprocessing through the NMS module to obtain the attribute information of the target road image;

The classification network includes a SoftMax classifier. The purpose is to realize the mutually exclusive classification of multiple vehicle categories. Alternatively, the classification network can also use the logistic regression of the YOLOv3 network for classification to realize multiple independent binary classification.

The NMS module is used for performing NMS processing. It is used to exclude prediction boxes with relatively small confidence from multiple prediction boxes that repeatedly select the same target.

For the contents of the classification network and the NMS module, please refer to the relevant description of the prior art, which will not be repeated here.

For each object, the detection result is in the form of a vector, including the position of the prediction box, the confidence of the vehicle in the prediction box and the category of the object in the prediction box. The position of the prediction box is used to characterize the position of the object in the target road image. Specifically, the position of each prediction box is represented by four values bx, by, bw and bh, bx and by are used to represent the center position of the prediction box, and bw and bh are used to represent the width and height of the prediction box. For example, there are 1 bus, 5 cars and 2 pedestrians in the road, which are located in different positions of the target road image. The position of the bus in the image is: taking the upper left corner as the origin, 230 pixels horizontally and 180 pixels vertically. The bus is 20 wide and 50 high in the image, its attribute information can be "230,180,20,50, bus".

The category of the object is the category of the object to which the object belongs, such as people, animals, buildings, vehicles, signs, etc.

In an optional embodiment, the objects may be only vehicles, and the categories may include cars, single-layer buses, double-layer buses, large trucks, vans, bicycles, motorcycles, etc.

In an optional embodiment, after obtaining the attribute information, the method can further include:
  outputting the attribute information.

In an embodiment, the attribute information can be displayed, including displaying the attribute information on the in-vehicle device.

Specifically, the attribute information can be displayed on the display screen in the vehicle, which can be the display screen of the navigation device or the display screen of the driver's mobile phone. The target road image marked with attribute information can be directly displayed on the display screen in the vehicle, so that the driver in the vehicle can directly observe the attribute information, so as to understand the position and category of each object displayed in the target road image. In this way, the driver in the distance can obtain the road conditions outside his sight distance and make appropriate driving behavior in advance, for example, slow down, route planning, object avoidance, etc. to achieve the purpose of safe driving. Of course, the attribute information can also be displayed in the form of other text, which is reasonable.

In another embodiment, the attribute information can be played in the form of voice, so that the driver can easily receive the attribute information when it is inconvenient to watch the image in the driving state, which is conducive to safe driving. Of course, the above two methods can be combined.

Optionally, displaying the attribute information on the in-vehicle device, can include:
  determining whether the object belongs to the small object to be reminded based on the position and/or category of the object;
  if yes, using the reminder mode to display the attribute information on the in-vehicle device; if not, using the general mode to display the attribute information on the in-vehicle device.

In this embodiment, a special reminder can be made for the small object. For example, according to the position of the object, the size of the prediction box where the object is located can be determined to judge whether the size of the prediction box is less than the preset prediction box size. If so, it can be determined that the object belongs to the small object to be reminded. Alternatively, the category of the object can be divided in advance, and some categories that obviously belong to small objects such as signboards can be preset as small object categories. Whether the object belongs to the small object to be reminded can be determined by judging whether the category of the object belongs to the preset small object category. Of course, in order to accurately determine the small object, the small object to be reminded can be determined in combination with the position and category of the object.

If the object belongs to the small object to be reminded, the attribute information can be displayed in the reminder mode on the in-vehicle device; For example, the target road image is marked with brightly colored fonts, or in the form of flashing, or supplemented by voice prompts, and so on. Of course, a combination of various reminder methods can be adopted.

If the object does not belong to the small object to be reminded, the general mode can be adopted on the in-vehicle device to display the attribute information, that is, the consistent mode is adopted for all objects, which will not be repeated here.

In an optional embodiment, after obtaining the attribute information, the method may further include:
  feedbacking based on the attribute information.

Specifically, after obtaining the attribute information, the driver can send the attribute information to the image collection terminal or other vehicles, pedestrians, etc., so that multiple terminals of the IoV system can obtain the attribute information for the purposes of information statistics and safe driving. Further, when the vehicle sends the information, it can carry the current position information of the vehicle, for example, coordinate information obtained through GPS (Global Positioning System) and current time information, so that the receiver can have a clearer understanding of road condition information.

In an optional embodiment, multiple target road images within a predetermined time period can be obtained for the object detection, the object trajectory tracking can be realized by using the position and category of the same object, and so on.

Moreover, the original YOLOv3 network contains more convolutional layers because it targets more categories of objects, including 80 kinds. In the embodiment of the disclosure, the object is mainly the object on the road, and the number of categories of the object is small, so a large number of convolutional layers are not necessary, which will waste network resources and reduce the processing speed.

Therefore, as mentioned earlier, compared with the number of convolutional layers contained in multiple residual modules of the backbone network in the original YOLOv3 network, in the improved YOLOv3 network, by setting the number of dense connection units contained in the dense connection module to 2, the number of convolution layers in the backbone network can be reduced for the target road image of the embodiment of the disclosure without affecting the network accuracy.

Alternatively, the improved YOLOv3 network can also be obtained by adjusting the value of k in the convolutional network module group of each prediction branch in the FPN, that is, k is reduced from 5 in the original YOLOv3 network to 4 or 3, that is, the original CBL*5 is changed to CBL*4 or CBL*3; In this way, the number of convolutional layers in the FPN can also be reduced, and the number of network layers can be reduced and the network processing speed can be improved for the target road image of the embodiment of the disclosure without affecting the network accuracy.

In schemes provided by the embodiments of the disclosure, on the first hand, the residual modules of the backbone network of the YOLOv3 network is replaced with the dense connection modules, and the feature fusion mode is changed from parallel to concatenate, so that the backbone network can directly take the early feature image as the input of each subsequent layer during performing feature extraction, and the amount of information of the feature image obtained is more, the feature transmission is strengthen, therefore, when detecting the target road image, the detection accuracy can be improved. Moreover, the number of parameters and the amount of computation can be reduced by reusing the feature image parameters of the shallow network. On the second hand, using multiple feature extraction scales to add fine-grained feature extraction scales for small objects can improve the detection accuracy of the small objects in the target road image. On the third hand, the feature fusion mode of the FPN is changed. The feature image extracted from the backbone network are fused in the mode of top-to-down and dense connection, and the deep features are directly performed up sampling in different multiples, so that all the transmitted feature images have the same size, and these feature images and shallow feature images are concatenately fused, more original information can be used, and high-dimensional semantic information is also involved in the shallow network, which helps to improve the detection accuracy; at the same time, more specific features can be obtained by directly receiving the features of the shallower network, which will effectively reduce the loss of features, reduce the amount of parameters to be calculated, improve the detection speed and achieve real-time detection. On the fourth hand, by performing layer pruning, sparse training, channel pruning and knowledge distillation to the pre trained network, and selecting optimized processing parameters in each processing process, the network volume can be simplified, most redundant calculations can be eliminated, and the detection speed can be greatly improved while maintaining the detection accuracy. The detection process of the cloud is deployed in the edge device with very limited storage resources and computing resources. The in-vehicle device can realize over the horizon road detection, realize high-precision and high real-time detection of objects on the road, and is conducive to the safe driving of drivers.

The following describes the network improvement and road image detection performance of the embodiment of the disclosure in combination with the experimental process of the applicant, so as to deeply understand its performance.

The disclosure selects UA-DETRAC data set for experiment. The capturing location of the UA-DETRAC data set is the road overpass in Beijing and Tianjin. The capturing equipment is cannon EOS550D, the video frame rate is 25 FPS, the data format is JPEG and the image size is 960*540. The data set contains 60 videos, which are captured on sunny days, cloudy days, rainy days and nights, including data under different climates. The total number of images is 82085, and the objects are marked. These marks are manually marked, so the marked data is more accurate. All images in each video are numbered sequentially under the same folder, and the marked data of all images in each video are recorded in an XML (Extensible Markup Language) file with the same name as the video folder.

In order to make the data distribution more random and fully improve the generalization ability of the model, the random sampling method is used to extract the data in the data set. The whole data set contains 82085 images. This embodiment extracts 10000 images for experiments. The training set and the test set are allocated according to the ratio of 4:1. In order to ensure that the training set and the test set do not contain the same pictures, random extraction shall be carried out again among the 10000 images to allocate the data set. In addition, training YOLO network needs to use VOC format or COCO format data, that is, five numbers are used to represent the type of box object, the position of the upper left corner and the length and width of the object, and these data are stored in the text document. Therefore, Python script is used to convert the annotation format of data set, and statistics are made on the type and proportion of objects in the data set.

Figure 5A:
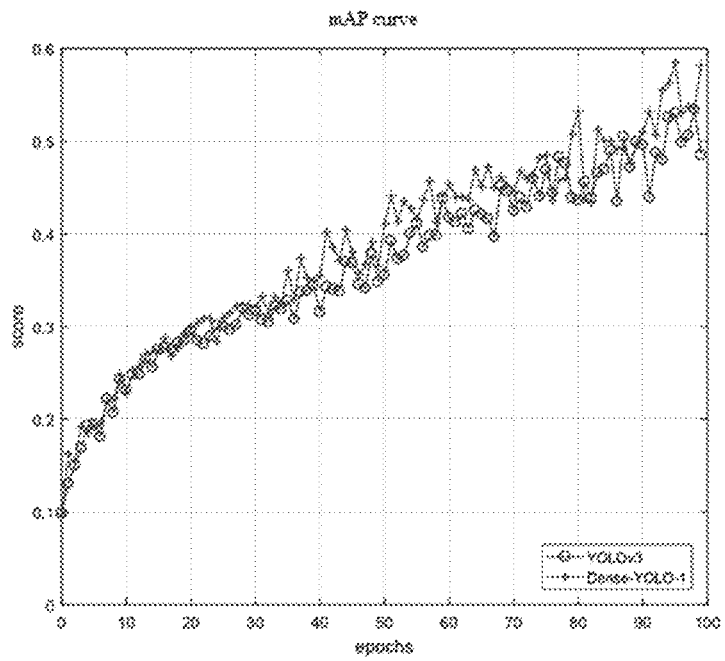
FIG. 5A is a schematic diagram of mAP curve comparison between the YOLOv3 of the prior art and the Dense-YOLO-1 of the embodiment of the disclosure.
Figure 5B:
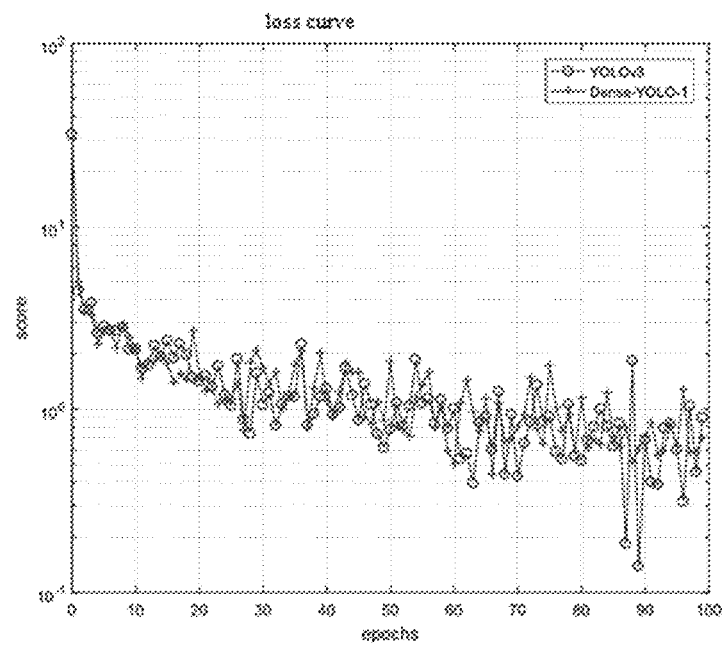
FIG. 5B is a schematic diagram of loss curve comparison between the YOLOv3 of the prior art and the Dense-YOLO-1 of the embodiment of the disclosure.

In the embodiment of the disclosure, the network after replacing the residual modules of the backbone network in the YOLOv3 network with the dense connection modules and improving the transition modules is named Dense-YOLO-1; For the structure of Dense-YOLO-1 network, please refer to the network of FIG. 2 and the backbone network of FIG. 3 for understanding, which will not be repeated here. The Dense-YOLO-1 and the YOLOv3 networks are tested. The mean average precision (mAP) of the model is selected as the evaluation object. The value of the mAP is between 0 and 1. The larger the mAP, the better the accuracy of the model. Of course, the loss curve of the model is also referred to observe the convergence of the model. The loss function is still constructed according to the loss function of the YOLOv3. The network volume and detection speed also need to be considered, so the model file size of different networks and the detection time of road image of different models on the server Tesla V100 and the edge device Jetson TX2 platform should be recorded. Please refer to FIG. 5A and FIG. 5B. FIG. 5A is a schematic diagram of mAP curve comparison between the YOLOv3 of the prior art and the Dense-YOLO-1 of the embodiment of the disclosure; FIG. 5B is a schematic diagram of loss curve comparison between the YOLOv3 of the prior art and the Dense-YOLO-1 of the embodiment of the disclosure. As can be seen from the FIG. 5A and FIG. 5B, the network accuracy of the Density-YOLO-1 has been improved by about 4%, and the difference of loss functions of the model is extremely slight. Therefore, the difference between them is amplified by semi logarithmic coordinates. It can be seen that the loss of the Density-YOLO-1 is slightly lower than that of the YOLOv3. Therefore, it can be seen from the accuracy and loss curve that replacing the residual structure in the YOLOv3 with the dense connection and improving the transition module between the dense connection modules can greatly improve the network performance.

TABLE 1 volume of the YOLOv3 and the Dense-YOLO-1 network models
and their detection time on different platforms

| network | size of model | detection time on Tesla V100 | detection time on Jetson TX2 |
|---|---|---|---|
| YOLOv3 | 236M | 42.8 ms | 221.1 ms |
| Dense-YOLO-1 | 131M | 39.0 ms | 214.7 ms |

The road image detection time of the network on different platforms is shown in Table 1. It can be seen that adding dense connections to the network can reduce the volume of the network and reduce the detection time.

Figure 6A:
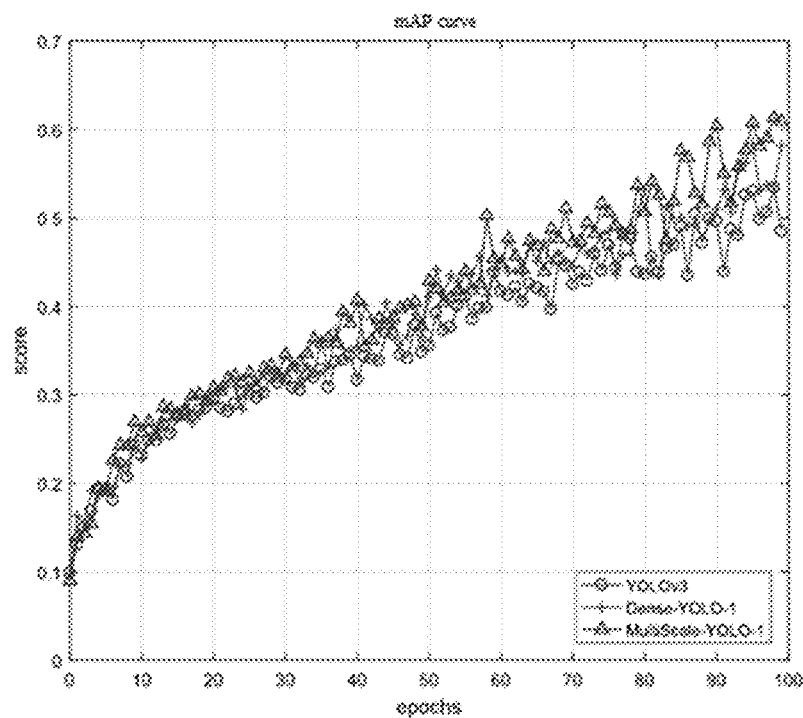
FIG. 6A is a schematic diagram of mAP curve comparison between the Dense-YOLO-1 and the MultiScale-YOLO-1 of the embodiment of the disclosure.
Figure 6B:
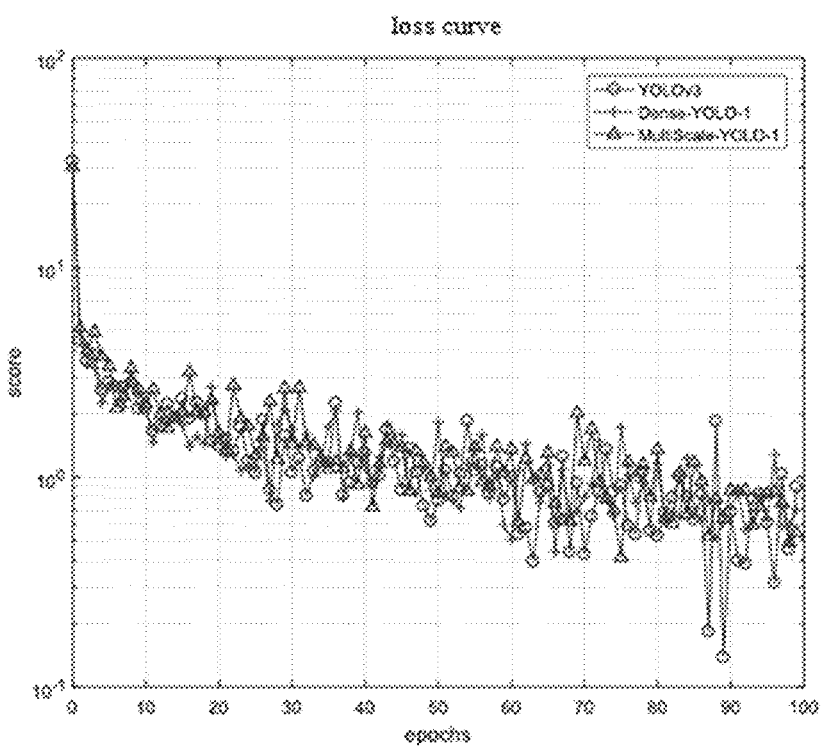
FIG. 6B is a schematic diagram of loss curve comparison between the Dense-YOLO-1 and the MultiScale-YOLO-1 of the embodiment of the disclosure.

On the basis of the Dense-YOLO-1, an improved idea of multi-scale is to add a finer grained object detection scale for the YOLOv3, so that the network can detect smaller objects. The embodiment of the disclosure specifically adds the scale with 104*104, and sets the corresponding anchor box sizes, and the obtained network is named MultiScale-YOLO-1. Please understand the network structure in combination with FIG. 2 and FIG. 3 and will not repeat it. MAP and loss curves of the Dense-YOLO-1 and the MultiScale-YOLO-1 networks are shown in FIG. 6A and FIG. 6B. It can be seen that compared with dense connection networks, multi-scale networks have improved, but the change is not obvious, only about 7%, and the difference of loss curves is still not obvious. This may be because when the number of small-sized objects in the data set is less, the demand for fine-grained recognition is not strong, and increasing more detailed object detection granularity has no obvious gain on network accuracy. In this regard, on the one hand, we can find a more detailed data set for small marked objects, so that the network can perform more fine-grained training in the training process, and can identify smaller objects in the recognition process. Of course, if the requirements are high, you can label the data set yourself when you have enough time and energy and do not have a suitable data set.

Figure 7A:
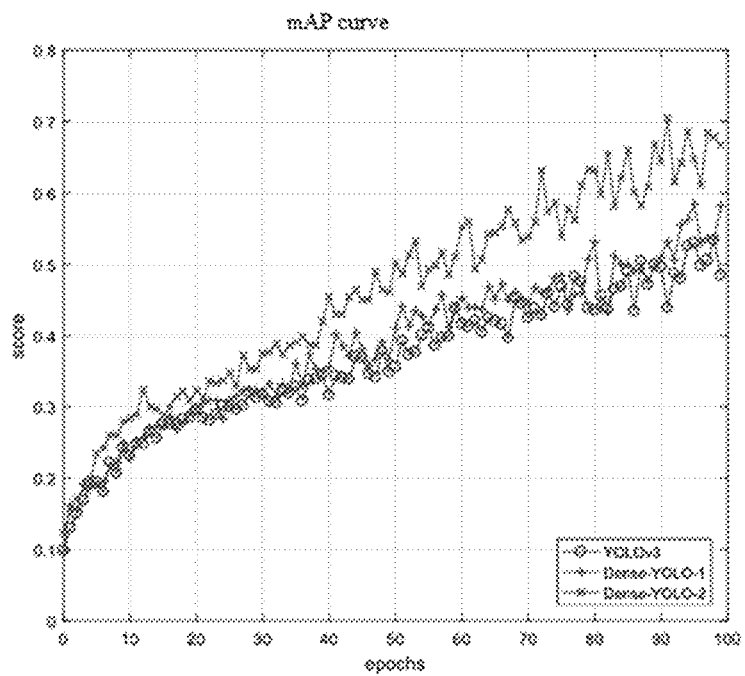
FIG. 7A is a schematic diagram of mAP curve comparison between the Dense-YOLO-1 and the Dense-YOLO-2 of the embodiment of the disclosure.
Figure 7B:
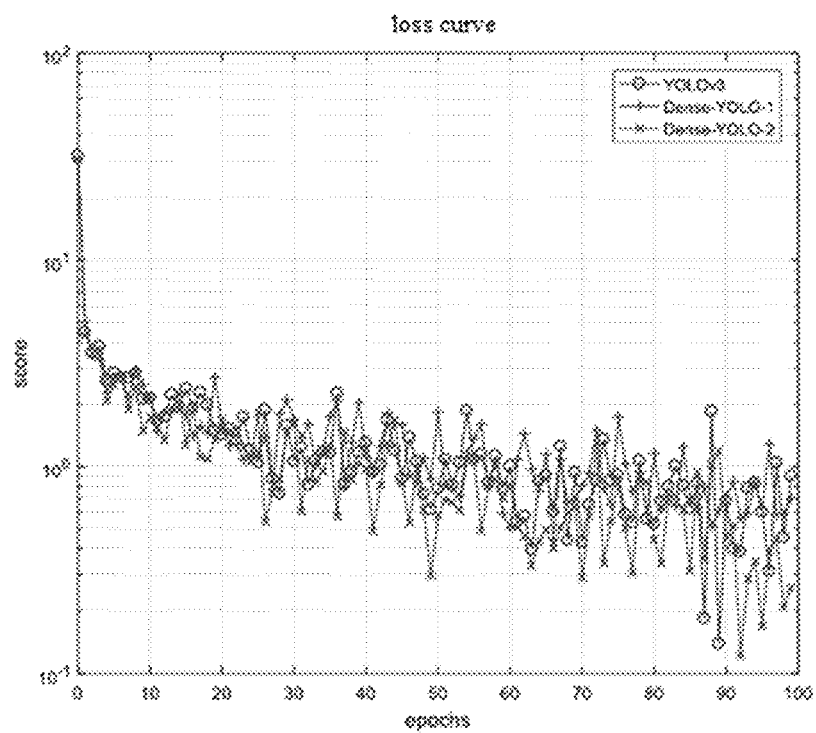
FIG. 7B is a schematic diagram of loss curve comparison between the Dense-YOLO-1 and the Dense-YOLO-2 of the embodiment of the disclosure.

On the basis of the Dense-YOLO-1, another improvement idea of multi-scale is to start with the method of feature fusion, and try to improve the method of feature fusion to fuse more dimensional semantic information in the detection process, so as to improve the accuracy of object recognition. Therefore, the feature fusion mode of the FPN is improved. The fusion mode of top-down and dense connection is adopted, and the obtained network is named Dense-YOLO-2. The network structure is no longer shown. MAP and loss curves of the Dense-YOLO-1 and the Dense-YOLO-2 networks are shown in FIG. 7A and FIG. 7B. In the multi-scale feature fusion network, which has changed the fusion mode and added the top-down dense connection feature fusion method, the multi-scale advantage is more obvious. This may be because the dense connection feature fusion method retains more high-dimensional abstract semantic information than the horizontal connection, making the model clearer for object discrimination. After changing the fusion mode, the network accuracy is increased by 18.2%, and the loss curve is also lower than before. According to the above curves, it can be seen that the improvement of fusion mode is very obvious for the improvement of network accuracy.

Figure 8A:
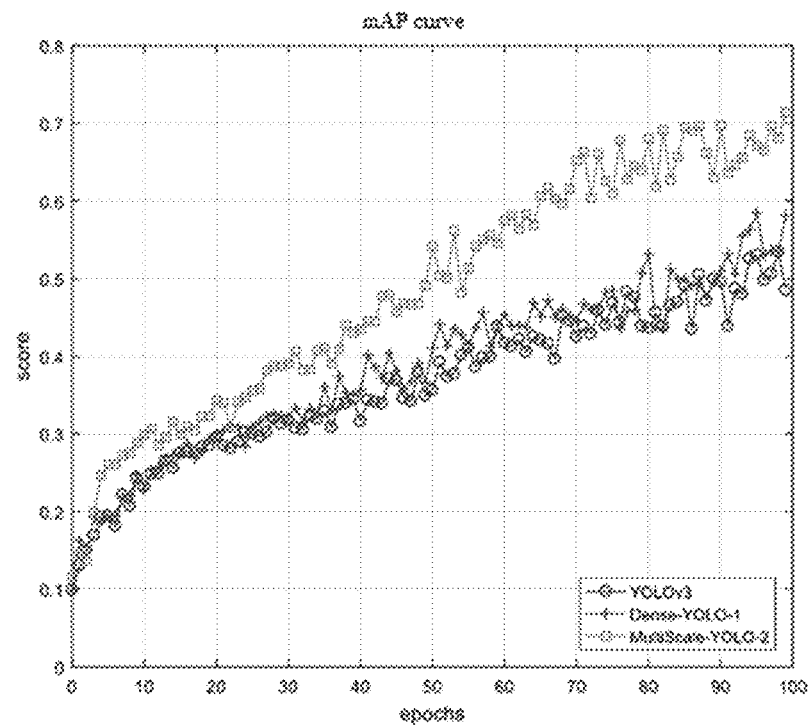
FIG. 8A is a schematic diagram of mAP curve comparison between the Dense-YOLO-1 and the MultiScale-YOLO-2 of the embodiment of the disclosure.
Figure 8B:
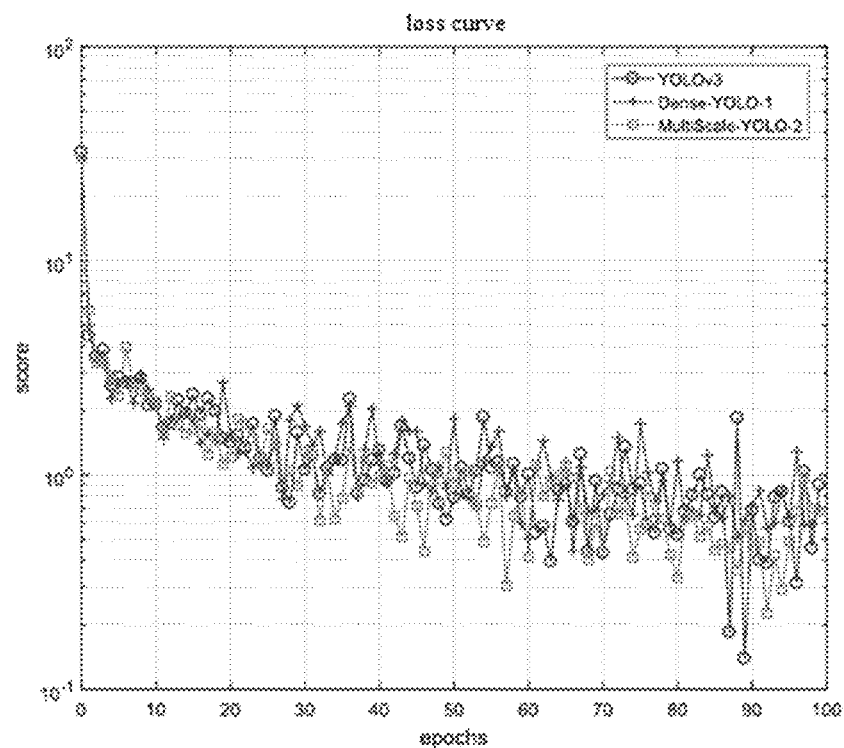
FIG. 8B is a schematic diagram of loss curve comparison between the Dense-YOLO-1 and the MultiScale-YOLO-2 of the embodiment of the disclosure.

Comprehensively considering the combination of the above two multi-scale improved methods on the basis of the Dense-YOLO-1, it not only uses the multi-scale feature fusion model to increase the vision of the network and improve the positioning accuracy of objects at different scales, but also use the top-down dense connection method to more fully fuse high-dimensional semantic information, so as to enhance the classification effect of different objects on the network. The final obtained network structure is named Multiscale-YOLO-2, and the structure is no longer shown. The accuracy and loss of the network are compared with that of the Dense-YOLO-1, as shown in FIG. 8A and FIG. 8B. It can be seen that, compared with the Dense-YOLO-1, the accuracy of the dense fusion network structure with more fine-grained vision is improved by 24.5%, and the loss curve is further reduced, which shows that such an improved method is effective.

As a neural network model that is expected to be used in the IoV, the network should have smaller parameter volume and faster detection speed. The volume of the multi-scale improved network model and the detection time of road image on different platforms are shown in Table 2.

TABLE 2 volume of multi-scale improved network model
and its detection time on different platforms

| network | size of model | detection time on Tesla V100 | detection time on Jetson TX2 |
|---|---|---|---|
| Dense-YOLO-2 | 489M | 35.1 ms | 300.0 ms |
| MutiScale-YOLO-1 | 132M | 41.2 ms | 243.4 ms |
| MutiScale-YOLO-2 | 491M | 44.8 ms | 350.6 ms |

Compared with the parameters of the Dense-YOLO given in Table 1, although increasing the finer field of view has little effect on the accuracy gain of the network, it has little effect on the volume of network parameters and detection time. Therefore, the embodiment chooses to use the more fine-grained field of view. At the same time, using of dense feature fusion mode causes the increase of network volume, but the detection time of the network is not affected. In the later stage, the network needs to be cut. Therefore, the feature fusion mode of dense connection is also retained. According to the above analysis, the MultiScale-YOLO-2 is finally selected as the improved network. This network is also the complex network mentioned above.

Figure 9A:
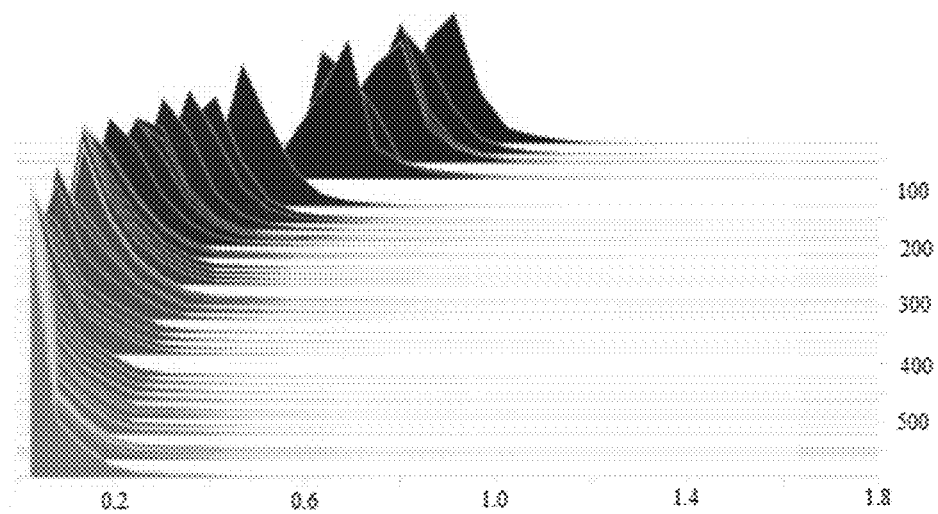
FIG. 9A is a schematic diagram of weight offset of the parameter combination 5 selected by the embodiment of the disclosure.
Figure 9B:
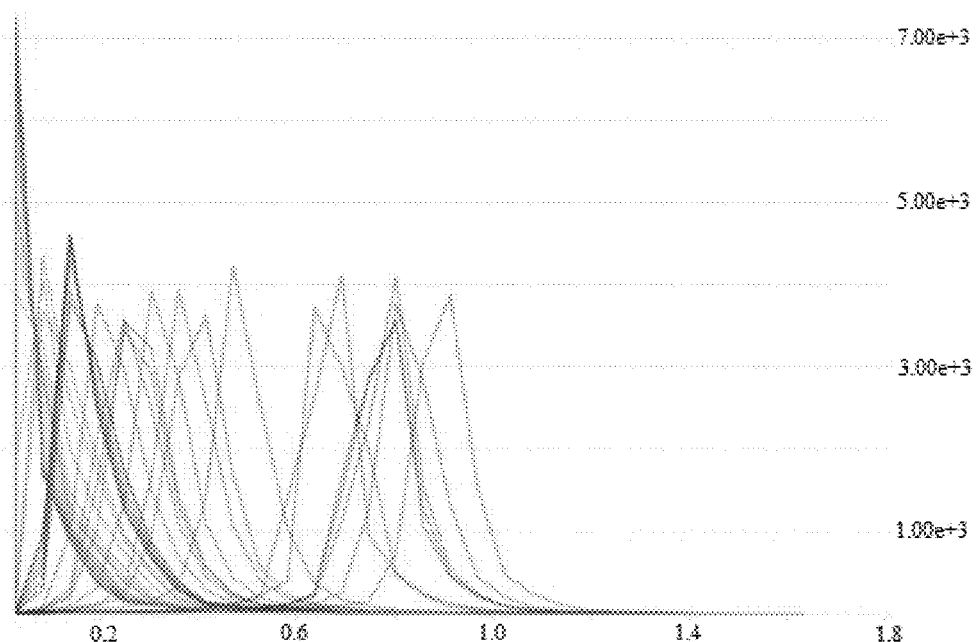
FIG. 9B is a schematic diagram of weight overlap of the parameter combination 5 selected by the embodiment of the disclosure.

For the sparse training, the learning rate and u can be adjusted one by one to ensure the convergence speed and accuracy. In this scheme, different learning rates and values of μ are tried, as shown in Table 3. By comparing γ weight distribution diagram, and finally selecting parameter combination 5. the γ weight distribution diagram of parameter combination 5 please see FIG. 9A and FIG. 9B. FIG. 9A shows the weight offset of parameter combination 5; FIG. 9B shows the weight overlap of parameter combination 5.

TABLE 3 different learning rates and combinations

| combination | learning rate | λ |
|---|---|---|
| 1 | 1× | 1× |
| 2 | 1× | 0.1× |
| 3 | 0.1× | 1× |
| 4 | 1× | 0.025× |
| 5 | 0.25× | 0.1× |

In fact, the initial experimental design of the embodiment did not include the pruning process of the network layer. The original plan was to perform channel pruning directly. However, according to the analysis of the results of the channel pruning, it is found that the weight of more than half of the dense connection layers is very close to 0. Therefore, according to the rules of the channel pruning, the channels of the whole layer will be cut off. This shows that there are redundant units in the dense connection module of a group of four dense connection units designed above. Therefore, before the channel pruning, the layer pruning can be performed to greatly reduce redundancy, and then relatively fine-grained channel pruning can be performed. Since more than half of the dense connection units are redundant units, the method of the layer pruning is to change the dense connection module from four dense connection units to two, simplify the network structure, and reduce the amount of parameters and operations of the network by nearly half. The network after the layer pruning is named MultiScale-YOLO-3 network, which can also be referred to as the YOLOv3-1 network for short.

Then, the YOLOv3-1 network is performed sparse training to obtain the YOLOv3-2 network with the sparse distribution of BN layer scaling coefficients;

The YOLOv3-2 network is performed channel pruning to obtain the YOLOv3-3 network;

The channel pruning ratio can be 60%. This is because a small number of objects types in the target road image to be detected are greatly affected in the process of network compression, which will directly affect mAP. Therefore, it should be considered from the aspects of data set and network compression ratio. For the processing of the data set, the embodiment of the disclosure selects the object types with a small number of merging to make the number of different types balanced, or directly adopts the data sets with more balanced type distribution, which is consistent with the application scenario of the embodiment of the disclosure. In addition, the compression ratio is controlled to ensure that the prediction accuracy of a small number of types will not decrease too much. According to the mAP simulation results, the compression ratio of 50%-60% represents the turning point of accuracy change, so the compression ratio of 60% can be preliminarily selected.

In addition to analyzing the impact of compression from accuracy, the relationship between detection time and model compression ratio should also be considered. The detection time of road image on different platforms (such as Tesla V100 server and Jetson TX2 edge device) of network models processed with different pruning ratios is simulated. According to the simulation results, it can be found that different network compression ratios have little impact on the detection time and have a great impact to the time required for the NMS. Before the compression ratio reaches 60%, the detection speed increases with the network compression, but after the compression ratio exceeds 60%, the detection speed slows down. Therefore, the finally selected the channel pruning ratio is 60%.

The improved YOLOv3 network is obtained by performing knowledge distillation to the YOLOv3-3 network.

Among them, the aforementioned complex network, namely the MultiScale-YOLO-2 network, is used as the teacher network.

The final obtained network, that is the improved YOLOv3 network, is named YOLO-Terse.

Figure 10:
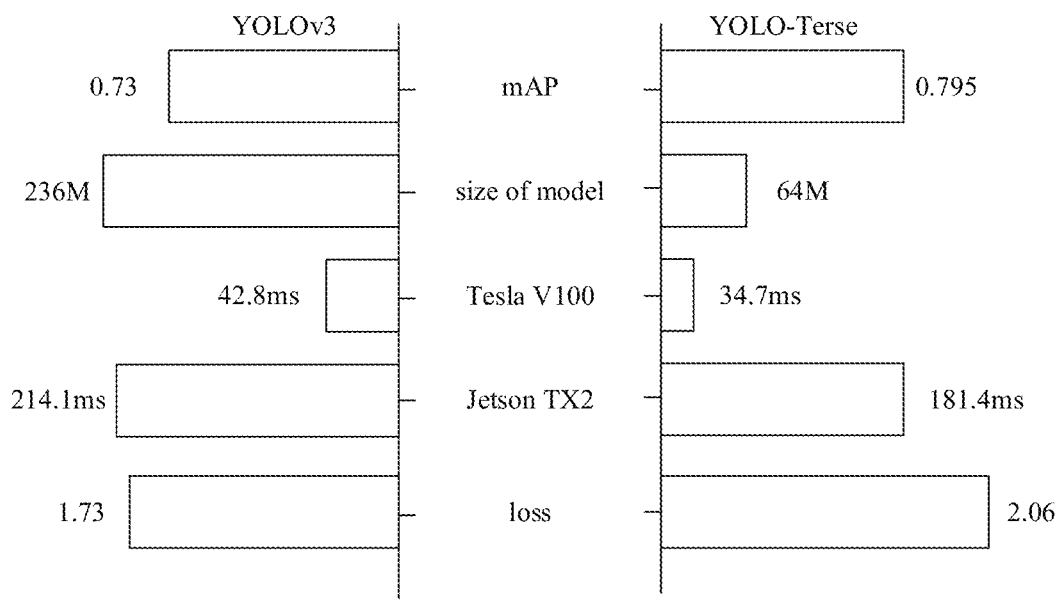
FIG. 10 is a schematic diagram of performance comparison between the improved YOLOv3 network (also referred to as YOLO-Terse) and the YOLOv3 network.

For the performance comparison between the YOLO-Terse and the YOLOv3, please refer to FIG. 10. FIG. 10 is a schematic diagram of performance comparison between the improved YOLOv3 network (also referred to as YOLO-Terse) and the YOLOv3 network. It can be seen that the accuracy of the YOLO-Terse is 9.0% higher than that of the YOLOv3, while the model size is reduced by 72.9%, and the detection time on Tesla V100 and Jetson TX2 is reduced by 18.9% and 15.3% respectively. This shows that when the accuracy is partially improved, the model volume is greatly reduced and the detection speed of road image is improved.

Figure 11:
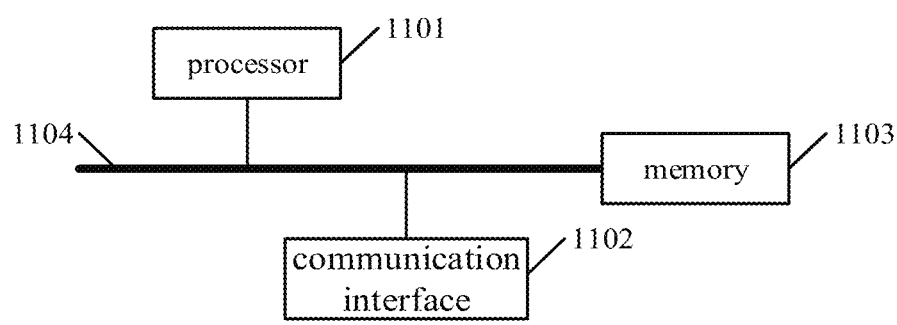
FIG. 11 is a schematic structural diagram of an in-vehicle electronic device according to an embodiment of the disclosure.

In a second aspect, corresponding to the above method embodiment, an embodiment of the disclosure also provides an in-vehicle electronic device, as shown in FIG. 11, including a processor 1101, a communication interface 1102, a memory 1103 and a communication bus 1104, in which the processor 1101, the communication interface 1102 and the memory 1103 are mutually communicated with through the communication bus 1104.

The memory 1103 is configured for storing computer programs.

The processor 1101 is configured to executing the computer programs stored in the memory 1103 to realize the steps of any of the above methods of road detection based on IoV.

The communication bus mentioned in the above electronic device can be a peripheral component interconnect (PCI) bus or an extended industry standard architecture (EISA) bus, etc. The communication bus can be divided into address bus, data bus, control bus, etc. for ease of representation, only one thick line is used in the FIG. 11, but it does not mean that there is only one bus or one type of bus.

The communication interface is used for communication between the electronic device and other devices.

The memory can include random access memory (RAM) or non-volatile memory (NVM), such as at least one disk memory. Alternatively, the memory can also be at least one storage device located away from the aforementioned processor.

The above processor can be a general-purpose processor, includes central processing unit (CPU), network processor (NP), etc.; it can also be digital signal processing (DSP), application specific integrated circuit (ASIC) and field-programmable gate array (FPGA) or other programmable logic devices, discrete gate or transistor logic devices, discrete hardware components.

The above is only a preferred embodiment of the disclosure and is not used to limit the protection scope of the disclosure. Any modification, equivalent replacement, improvement, etc. made within the spirit and principles of the disclosure are included in the protection scope of the disclosure.

What is claimed is:

1. A method of road detection based on Internet of Vehicles (IoV), applied to vehicle terminals, and the method comprising:
   obtaining a target road image captured by an image collection terminal;
   inputting the target road image into an improved YOLOv3 network obtained by pre-training, and performing feature extraction to the target road image by using a backbone network of dense connection to obtain x number of feature images with different scales, wherein x is a natural number greater than or equal to 4;
   performing feature fusion of top-to-down and dense connection to the x number of feature images with different scales by using an improved feature pyramid network (FPN) to obtain prediction results corresponding to the respective scales; and
   obtaining attribute information of the target road image according to the prediction results, wherein the attribute information comprises positions and categories of objects in the target road image;

wherein the improved YOLOv3 network comprises the backbone network of dense connection and the improved FPN;

wherein the improved YOLOv3 is formed by that based on a YOLOv3 network, replacing residual modules of a backbone network to dense connection modules, increasing a feature extraction scale, optimizing a feature fusion mode of a FPN to obtain the improved FPN, performing pruning and performing network recovery processing guided by knowledge distillation; and wherein the improved YOLOv3 network is trained according to sample road images and positions and categories of objects corresponding to the sample road images.

2. The method according to claim 1, wherein the backbone network of dense connection comprises: dense connection modules and transition modules connected in series and arranged alternately; and a number of the dense connection modules is y;

wherein the dense connection module comprises a convolutional network module and a dense connection unit group connected in series; the convolutional network module comprises a convolutional layer, a batch normalization (BN) layer and a Leaky relu layer connected in series; and the dense connection unit group comprises m number of dense connection units;

wherein each of the m number of dense connection units comprises a plurality of convolutional network modules connected in a dense connection mode and concatenately fuses feature images output by the plurality of convolutional network modules; and wherein y is a natural number greater than or equal to 4, and m is a natural number greater than 1.

3. The method according to claim 2, wherein the obtain x number of feature images with different scales, comprises:

obtaining the x number of feature images with gradually increased scales which are respectively outputted from x number of the dense connection modules sequentially arranged along a direction reverse to an input direction of the x number of dense connection modules.

4. The method according to claim 3, wherein the performing feature fusion of top-to-down and dense connection to the x number of feature images with different scales by using an improved FPN, comprises:

for a prediction branch $Y_i$, acquiring the feature image with a corresponding scale from the x number of feature images with different scales and then performing convolution processing to obtain a convolution processed feature image; and performing concatenated fusion to the convolution processed feature image and the feature images after convolution processing and up-sampling processing on prediction branches $Y_{i-1} \sim Y_1$;

wherein the improved FPN comprises x number of prediction branches $Y_1 \sim Y_x$ with gradually increased scales, the scales of the x number of prediction branches $Y_1 \sim Y_x$ and the scales of the x number of feature images are corresponded one by one, and an up-sampling multiple of the prediction branch $Y_{i-j}$ is $2^j$, where i=2, 3, . . . , x, and j is a natural number less than i.

5. The method according to claim 2, wherein each of the transition modules comprises second convolutional network modules and a Maxpool layer; an input of the second convolutional network modules is shared with an input of the Maxpool layer, and a feature image output by the second convolutional network modules and a feature image output by the Maxpool layer are fused in concatenated mode.

6. The method according to claim 5, wherein a number of the second convolutional network modules comprised in each of the transition modules is two or three, and the second convolutional network modules are connected in series.

7. The method according to claim 2, wherein the performing pruning and performing network recovery processing guided by knowledge distillation, comprises:

for a network obtained by replacing the residual modules of the backbone network to the dense connection modules, increasing the feature extraction scale and optimizing the feature fusion mode of the FPN based on the YOLOv3 network, performing layer pruning to the dense connection modules of the backbone network of dense connection to obtain a YOLOv3-1 network;

performing sparse training to the YLOLv3-1 network to obtain a YOLOv3-2 network with a sparse distribution of BN layer scaling coefficients;

performing channel pruning to the YLOLv3-2 network to obtain a YOLOv3-3 network; and performing knowledge distillation to the YOLOv3-3 network to obtain the improved YOLOv3 network.

8. The method according to claim 1, wherein before the improved YOLOv3 network is trained, the method further comprises:

determining a pending clustering number for anchor box sizes of the sample road images;

obtaining a plurality of the sample road images marked with target box sizes;

based on the plurality of sample road images marked with the target box sizes, obtaining clustering results of the anchor box sizes of the sample road images by using a K-Means clustering method; and writing the clustering results into configuration files of the improved YOLOv3 network.

9. The method according to claim 1, wherein the improved YOLOv3 network further comprises: a classification network and a non_max_suppression (NMS) module;

wherein the obtaining attribute information of the target road image according to the prediction results, comprises:

performing classification processing to the prediction results through the classification network, and then performing prediction box de reprocessing through the NMS module to obtain the attribute information of the target road image;

wherein the classification network comprises a SoftMax classifier.

10. An in-vehicle electronic device, comprising a processor, a communication interface, a memory and a communication bus;

wherein the processor, the communication interface and the memory are mutually communicated through the communication bus;

wherein the memory is configured for storing computer programs; and wherein the processor is configured for executing the computer programs stored in the memory to realize the method according to claim 1.

* * * * *